United States Patent
Lacoste et al.

(10) Patent No.: US 9,935,801 B2
(45) Date of Patent: Apr. 3, 2018

(54) METHOD FOR TRANSMITTING DATA BY RADIOFREQUENCY LINK IN A REMOTE-READING APPARATUS

(71) Applicants: GrDF, Paris (FR); SUEZ Groupe, Paris la Defense (FR)

(72) Inventors: Robert Lacoste, Chaville (FR); Jean-Louis Dornstetter, Choisel (FR)

(73) Assignees: GRDF, Paris (FR); SUEZ GROUPE, Paris la Defense (FR)

( * ) Notice: Subject to any disclaimer, the term of this patent is extended or adjusted under 35 U.S.C. 154(b) by 0 days.

(21) Appl. No.: 15/108,248

(22) PCT Filed: Dec. 23, 2014

(86) PCT No.: PCT/FR2014/053533
§ 371 (c)(1),
(2) Date: Jun. 24, 2016

(87) PCT Pub. No.: WO2015/097405
PCT Pub. Date: Jul. 2, 2015

(65) Prior Publication Data
US 2016/0330054 A1   Nov. 10, 2016

(30) Foreign Application Priority Data

Dec. 26, 2013 (FR) ..................................... 13 63582

(51) Int. Cl.
*H04L 27/12* (2006.01)
*H04L 27/14* (2006.01)
(Continued)

(52) U.S. Cl.
CPC .............. *H04L 27/14* (2013.01); *H04L 7/033* (2013.01); *H04L 27/10* (2013.01); *H04L 27/122* (2013.01);
(Continued)

(58) Field of Classification Search
CPC ... H04L 27/14; H04L 27/2014; H04L 27/122; H04L 27/10; H04L 7/033;
(Continued)

(56) References Cited

U.S. PATENT DOCUMENTS 4,135,181 A * 1/1979 Bogacki .............. H02J 13/0089
340/3.51
4,204,195 A * 5/1980 Bogacki ................. G01D 4/004
340/3.21
(Continued)

FOREIGN PATENT DOCUMENTS

WO   WO 2012/173573   12/2012

OTHER PUBLICATIONS

International Search Report of International Application No. PCT/FR2014/053533 dated Apr. 9, 2015.
(Continued)

*Primary Examiner* — Helene Tayong
(74) *Attorney, Agent, or Firm* — Finnegan, Henderson, Farabow, Garrett & Dunner LLP

(57) ABSTRACT

The invention relates to a method for controlling digital data transmission in a remote-reading apparatus including a plurality of metering devices, each equipped with a radiofrequency module for communicating with a radiofrequency transmission/reception device of a gateway system of the apparatus, the method comprising a step of transmitting a digital signal from the radiofrequency module to the radiofrequency transmission/reception device and/or from the radiofrequency transmission/reception device to the radiofrequency module, the transmission being carried out via a carrier modulated by frequency shift modulation, the method being characterized in that the frequency shift modulation has a modulation index strictly equal to an integer value divided by two, and in that it includes a step
(Continued)

of receiving the signal transmitted according to the modulation, comprising operations of generation of a synchronization signal synchronized with the received signal and synchronous detection of the received signal using the synchronization signal.

5 Claims, 1 Drawing Sheet

(51) Int. Cl.
*H04L 27/10* (2006.01)
*H04W 56/00* (2009.01)
*H04Q 9/00* (2006.01)
*H04L 7/033* (2006.01)
*H04W 4/00* (2018.01)
*H04L 27/20* (2006.01)
*H04W 88/16* (2009.01)

(52) U.S. Cl.
CPC .............. *H04Q 9/00* (2013.01); *H04W 4/005* (2013.01); *H04W 56/004* (2013.01); *H04W 56/0015* (2013.01); *H04W 56/0035* (2013.01); *H04L 27/2014* (2013.01); *H04Q 2209/40* (2013.01); *H04Q 2209/60* (2013.01); *H04W 88/16* (2013.01)

(58) Field of Classification Search
CPC .......... H04Q 2209/40; H04Q 2209/60; H04W 88/16; H04W 56/0015
USPC ......................................................... 375/303
See application file for complete search history.

(56) References Cited

U.S. PATENT DOCUMENTS

| | | | |
|---|---|---|---|
| 5,959,550 A * | 9/1999 | Giles ................... | H02J 13/0075 340/870.02 |
| 2004/0190663 A1 | 9/2004 | Carsello et al. | |
| 2007/0150237 A1* | 6/2007 | Swarztrauber ......... | G01D 4/002 702/188 |
| 2010/0075611 A1* | 3/2010 | Budampati .......... | H04B 7/0885 455/67.11 |
| 2011/0109472 A1* | 5/2011 | Spirakis ................ | G06Q 10/06 340/870.02 |
| 2011/0243277 A1 | 10/2011 | Noel | |

OTHER PUBLICATIONS

Kim et al. "An ISM Band CMOS Integrated Wireless Telemetry Transceiver (In A 0.18 MUM Coppper CMOS Process)", Connecting the Mobile World : Proceedings/IEEE VTS 53$^{rd}$ Vehicular Technology Conference, Spring 2001, IEEE Service Center USA, col. CONF. 53, May 6, 2001 (May 6, 2001), pp. 2813-2817.

* cited by examiner

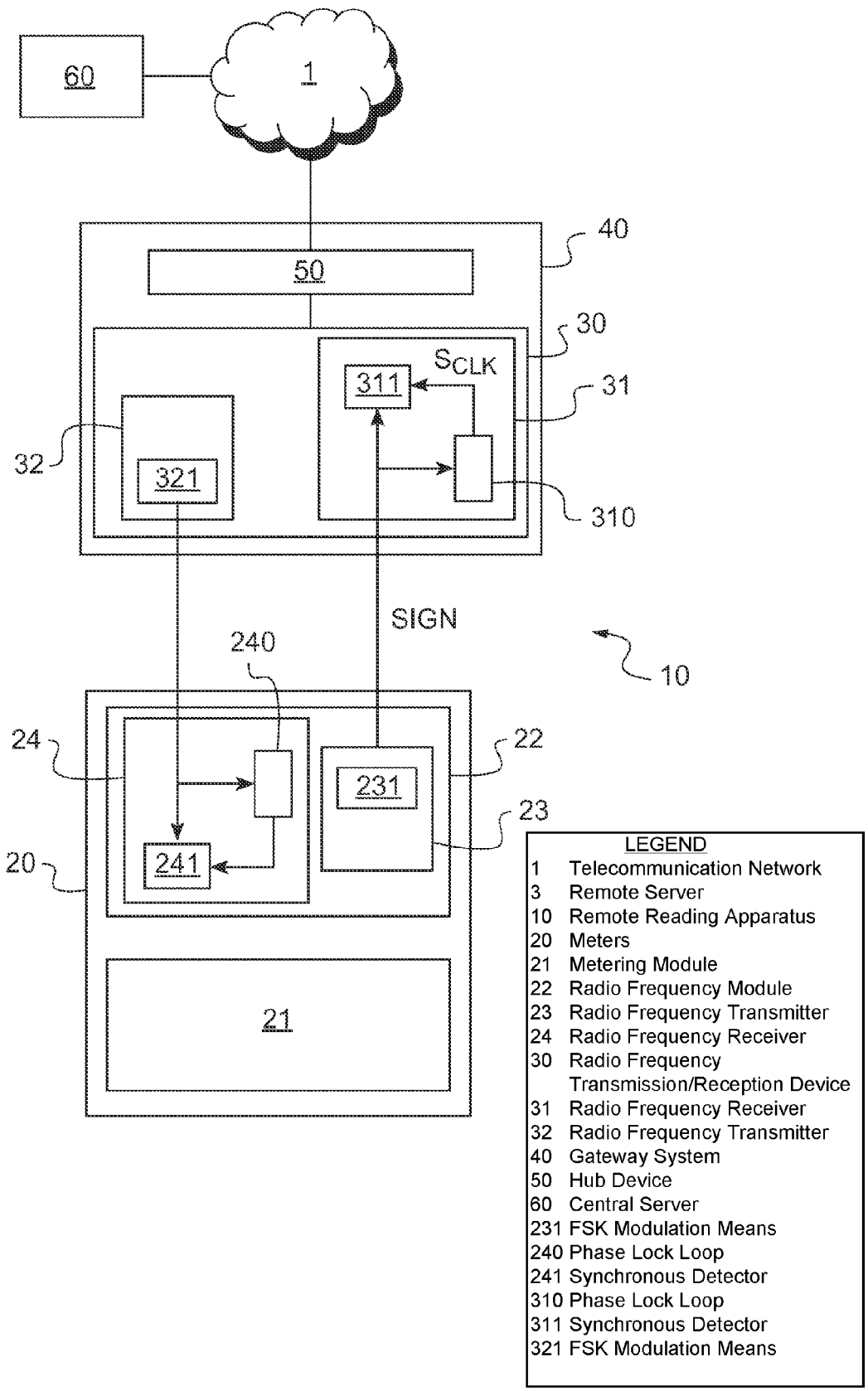

METHOD FOR TRANSMITTING DATA BY RADIOFREQUENCY LINK IN A REMOTE-READING APPARATUS

CROSS REFERENCE TO RELATED APPLICATIONS

This application is a national stage entry of International Application No. PCT/FR2014/053533 filed on Dec. 23, 2014, and claims priority to and the benefit of the filing date of French Patent Application No. 1363582, filed on Dec. 26, 2013, the entire contents of which are incorporated by reference herein.

The present invention relates to the control of communications in a remote-reading apparatus. More particularly, it concerns a method for controlling transmissions of digital data by radiofrequency link in a remote-reading apparatus.

A remote-reading apparatus conventionally comprises a plurality of metering devices, for example water, gas, electricity or other meters, together with gateways communicating with the metering devices on the one hand, and with an external telecommunications network on the other hand.

The metering devices transmit data, for example water consumption data, or, more generally, data on fluid or energy consumption or data based on measurements (of temperature, pollution, etc.), to one or more gateway systems. Each gateway system transmits the data received from the metering devices to the telecommunications network. The data collected in this way can subsequently be analyzed, for customer billing for example, and also for the detection of any leakage or other faults.

The metering devices each comprise a radiofrequency module for communicating with the neighboring gateway system or systems. This radiofrequency module may, for example, emit relatively short-range radiation, at a carrier frequency of 169 MHz for example, or at 433 or 868 MHz.

A gateway system comprises a hub device, or collection cabinet, installed in a service room of a building for example, and one or more radiofrequency transmission/reception devices, installed on the roof of the building for example, for communication with the radiofrequency modules of the metering devices. Thus the data received from the metering devices are transmitted to the hub device installed on the site, which assembles them and transfers them to the installation operator via the external telecommunications network.

In the interests of reliability, remote-reading apparatuses require the deployment of radiofrequency transmission/reception devices for gateway systems in a sufficient number and also in an optimized position, in order to provide a sufficiently reliable radiofrequency link to the set of metering devices. This requirement, which aims to ensure optimal collection of the data supplied by the metering devices at the data hubs, has a direct effect on the cost of deployment of an apparatus of this type, a cost which it is evidently desirable to reduce.

At the present time, radio communications between the various items of equipment of remote-reading apparatuses are based on the use of a radiofrequency protocol according to European Standard EN 13757-4. This standard protocol specifies FSK, GFSK or 4GFSK frequency modulation, depending on the modes. According to the technical constraints of this standard, the associated receiver must be a non-coherent FSK receiver, implying an Eb/N0 ratio (Eb=energy per bit transmitted, N0=power spectral density of the noise) of about 12 dB for a binary error rate of $10^{-4}$. Typically, the sensitivity that can be achieved for a receiver of this type is about $-174$ dBm+10 log(B)+Eb/N0+NF, where B is the bit rate and NF is the noise factor of the receiver, so that, for example, the maximum sensitivity is about $-123$ dBm (decibels per milliwatt) where B=2400 bps, Eb/N0=12 dB and NF=5 dB. To ensure that the received signal is intelligible to the receiver, the latter must have sufficient sensitivity. In other words, the effective power of the received signal must be greater than the sensitivity of the receiver, otherwise the signal cannot be used.

With the aim of increasing the reliability of communication, the idea of increasing the power of the signal transmitted at the radiofrequency modules of the metering devices has been considered, but this solution is costly in terms of consumption of the battery providing the necessary power supply to the metering devices, and therefore reduces the battery life, which is undesirable.

Solutions are also known from the patent documents FR2961054 and FR2977943 for improving the sensitivity of the receiver by using very narrow band modulation. Each transmitter is configured in advance to transmit signals in a very narrow sub-band of the available frequency range, thus ensuring a low level of collision between signals transmitted by different transmitters. Additionally, the patent document FR289400 discloses a solution which uses a coding of the signals transmitted in direct spread spectrum sequence (DSSS), associated at the reception end with a digital correlator.

However, these solutions not only run the risk of increasing the complexity and cost of the radiofrequency modules of the metering devices and the radiofrequency transmission/reception devices of the gateway systems, but also have the disadvantage of no longer being compatible with the current standard forming the basis of the radiofrequency communications protocol used by most remote-reading apparatus.

Consequently there is a need for a method of controlling the transmission of digital data by radiofrequency link in a remote-reading apparatus which will enable conformity with the current standard for the radiofrequency communications protocol to be reconciled with the optimization of the performance of the radiofrequency link for the purpose of improving the sensitivity of the receivers deployed in this apparatus.

To this end, a method is proposed for controlling digital data transmission in a remote-reading apparatus comprising a plurality of metering devices, each metering device comprising a metering module and a radiofrequency module comprising a radiofrequency transmitter/receiver for communicating with a transmission/reception device of a gateway system of said apparatus, said method comprising a step of transmitting a digital signal from said radiofrequency module to said radiofrequency transmission/reception device and/or from said radiofrequency transmission/reception device to said radiofrequency module, said transmission being carried out via a carrier modulated by frequency shift modulation, said method being characterized in that said frequency shift modulation has a modulation index strictly equal to an integer value divided by two, in other words strictly a multiple of ½, and in that it comprises a step of receiving the signal transmitted according to said modulation and in that the received signal, transmitted according to said modulation, is used to drive a phase lock loop adapted to generate a synchronization signal synchronized with the modulation, said synchronization signal driving a detector for providing synchronous detection of the received signal by means of said synchronization signal.

Thus, at the transmission end, the generated modulation is phase-coherent, and therefore there is no phase discontinuity in the transmitted modulated signal. This modulation method advantageously makes it possible to perform synchronization at the reception end on the received signal, using the phase information of the carrier, or at least provides assistance with synchronization while enabling the information carried by the received signal to be retrieved by means of a synchronous detector. This transmission control can, notably, improve performance at the reception end in terms of the Eb/N0 ratio, synchronous demodulation providing a typical gain of 3 dB compared with the asynchronous demodulation which is conventionally used.

In other words, frequency shift modulation with a modulation index strictly equal to an integer value divided by two advantageously enables a frequency synchronization method to be used at the receiver end, leading to synchronous detection of the transmitted bits. This detection requires, in particular, the availability of a reference synchronized with the modulation, making it possible to provide the phase lock loop which is used at the receiver end and which can generate a synchronization signal synchronized with the modulation for driving a detector providing synchronous detection of the transmitted bits. Thus the received signal parameters, particularly the frequency and the phase, are known at the receiver as a result of the synchronization, so that a coherent receiver is obtained.

Since the reception sensitivity is improved, it is possible to benefit from a longer transmission range, and thus extend the coverage of a remote-reading apparatus, while limiting the modifications to be made to the equipment already installed in existing apparatus. Because of this gain reception sensitivity, it is advantageously possible to increase the distance between the metering devices and the radiofrequency transmission/reception devices of the gateway system or systems in the remote-reading apparatus, thereby reducing the number of radiofrequency transmission/reception devices needed and consequently simplifying the installation infrastructure of the apparatus.

Alternatively or additionally, the choice may be made to take advantage of this sensitivity gain to reduce the transmission power of the metering devices, while ensuring that all the data supplied by the latter are in fact received. This may be particularly advantageous because the radiofrequency modules of metering devices are usually battery-powered, and are intended to operate for a period of about 15 to 20 years.

Yet another advantage of the gain in reception sensitivity is that it may be possible to retrieve information representing data sent from metering devices which are intrinsically difficult to retrieve, particularly those sent by metering devices positioned in an environment that may impede correct transmission by radiofrequency link.

By deciding to specify more precisely the modulation as stated in the aforementioned current standard, in order to characterize a phase-coherent transmitter and thereby enable a phase-coherent receiver to be provided for reception, it is thus possible to improve the reliability of the radiofrequency communications between equipment in a remote-reading apparatus, in a relatively simple and inexpensive way.

The invention may also make it possible to limit the modifications to be made to the equipment already installed in existing remote-reading apparatus.

The invention also relates to a radiofrequency transmission/reception device for a gateway system of a remote-reading apparatus further comprising a plurality of metering devices, each metering device comprising a metering module and a radiofrequency module for communicating with this radiofrequency transmission/reception device, this gateway system further comprising a hub device communicating, on the one hand, with this radiofrequency transmission/reception device, and, on the other hand, with at least one external telecommunications network, the radiofrequency transmission/reception device being characterized in that it comprises a radiofrequency receiver comprising receiving means for receiving a phase-coherent frequency shift modulation signal from at least one metering device, synchronization means adapted to generate a synchronization signal synchronized with the modulation and a detector designed to provide synchronous detection of said received signal by means of the generated synchronization signal in such a way that said detection is synchronized as a function of said received signal.

Advantageously, the radiofrequency transmission/reception device comprises a radiofrequency transmitter comprising a means for the frequency shift modulation of a carrier, said modulation means being arranged to modulate the carrier according to a modulation index strictly equal to an integer value divided by two, so that the generated modulation is phase-coherent.

The radiofrequency transmission/reception device may comprise a processor, for example a DSP (from the English term "Digital Signal Processor"), a microcontroller, a microprocessor and/or another device.

A metering device for a remote-reading apparatus is also proposed, of the type comprising a metering module and a radiofrequency module for communicating with at least one radiofrequency transmission/reception device of a gateway system of said remote-reading apparatus, said radiofrequency module comprising a radiofrequency transmitter comprising means for frequency shift modulation of a carrier, characterized in that said modulation means are arranged to modulate the carrier according to a modulation index strictly equal to an integer value divided by two, so that the generated modulation is phase-coherent, and in that said radiofrequency module of said metering device comprises a radiofrequency receiver comprising receiving means for receiving a phase-coherent frequency shift modulation signal from said radiofrequency transmission/reception device, synchronization means adapted to generate a synchronization signal synchronized with the modulation, and a detector designed to provide synchronous detection of said received signal by means of the generated synchronization signal, in such a way that said detection is synchronized as a function of said received signal.

The radiofrequency module may comprise a processor, for example a microcontroller, and a low-cost frequency synthesis transmitter/receiver component, and/or a DSP or other device.

A remote-reading apparatus, notably for water or gas meters, is also proposed, comprising a plurality of metering devices according to the invention and a gateway system comprising at least one radiofrequency transmission/reception device according to the invention.

The invention may be particularly applicable to the remote reading of a water meter, but is not limited to this example of application. For example, the invention may be used with electricity meters, gas meters, or others.

BRIEF DESCRIPTION OF THE DRAWINGS

Other distinctive features and advantages of the invention will be evident from a reading of the following description of a specific embodiment of the invention, provided for guidance in a non-limiting way, with reference to FIG. 1 which shows schematically an example of a remote-reading apparatus according to one embodiment of the invention.

DETAILED DESCRIPTION

A remote-reading apparatus 10 comprises a set of metering devices, or meters, 20. Each counting device 20 comprises a metering module 21 arranged to measure water consumption, for example; that is to say, the apparatus may be a remote-reading apparatus for reading water meters. More generally, the metering modules of the metering device 20 may be arranged to measure consumption of fluid, energy, or other consumption, or to measure a parameter value. The metering modules may, for example, comprise sensors, for example temperature, pressure, level or other sensors. The invention can thus be applied in the field of remote monitoring of a fluid or energy distribution network.

Each metering device 20 further comprises a radiofrequency module 22 comprising, notably, an antenna (not shown), for communicating with a radiofrequency transmission/reception device 30 of a gateway system 40. The radiofrequency module 22 transmits radiation in a free band, around 169 MHz for example.

Conventionally one or more metering devices 20 are installed per housing. Gateway systems 40 are also provided, for example one gateway system 40 per building or per group of dwellings. It is desirable for each gateway system 40 to communicate with a set of metering devices 20. Each gateway system 40 can thus comprise a data hub device 50 and one or more radiofrequency transmission/reception devices 30. For example, a data hub device 50 is installed in a collection cabinet in an entry hall of a building, and three or four radiofrequency transmission/reception devices are installed on the roof of the building or on the walls, to ensure that all the data frames transmitted by the various metering devices in the building are received.

The link between the data hub device 50 and the radiofrequency transmission/reception devices 30 is, for example, an Ethernet link. The gateway system 40 also communicates with a central server 60 controlled by an operator of the fluid or energy distribution network, via a telecommunications network 1. This telecommunications network 1 between the remote server 3 and the gateway system 40 may be a WAN (from the English term "Wide Area Network"), for example a wired network, a GPRS (from the English term "General Packet Radio Service") wireless network, or other.

In the prior art, and as mentioned above, in most remote-reading apparatuses such as that which has just been described, communications between the metering devices and the radiofrequency transmission/reception devices of the gateway system are based on the use of a radiofrequency communications protocol according to European Standard EN 13757-4. This standard protocol specifies FSK, GFSK or 4GFSK frequency shift modulation, depending on the modes. The frequency shift is typically specified with a reasonable degree of latitude, for example +/−2.2 kHz to +/−2.6 kHz for a bit rate of 2400 bps (bits per second), meaning that the carrier frequency radiated by a metering device during its periods of activity is shifted from its central value which characterizes the channel assigned to the metering device, by the addition or subtraction of the aforementioned shift values during each time interval corresponding to the transmission duration of a bit, the sign of the shift depending on the value of the bit to be transmitted.

Thus, the radiofrequency module 22 of each metering device 20 comprises a radiofrequency transmitter 23 of the type comprising FSK modulation means 231 according to the specifications of the EN13757-4 standard. According to the invention, these modulation means 231 are defined with a more restrictive specification, taking the aforesaid standard into account, and in fact are arranged according to the invention to modulate the carrier according to a modulation index strictly equal to an integer value divided by two, so that the generated modulation is phase-coherent. Thus there is no phase discontinuity in the signal transmitted from the output of the radiofrequency module 22 toward the radiofrequency transmission/reception device 30. For this purpose, the modulation means 231 may be made in the form of a conventional transmission integrated circuit, incorporating a frequency synthesizer and a digital modulator, the latter then being configured to perform a carrier modulation of the FSK type with a modulation index which is strictly a multiple of ½. The generated modulation is therefore phase-coherent.

A signal SIGN of phase-coherent frequency shift modulation of the FSK type is therefore sent from the metering device 20 toward the gateway system 40. According to the invention, the radiofrequency transmission/reception device 30 of the gateway system comprises a radiofrequency receiver 31 configured to exploit the specific features of the modulation used to improve the performance of the receiver in terms of the Eb/NO ratio. In particular, the radiofrequency receiver 31 comprises a phase lock loop 310, which receives at its input a signal sent from an oscillator which is not shown, while the received phase-coherent modulation signal SIGN is used as the reference for the phase lock loop 310, this phase lock loop 310 generating a synchronization signal SCLK synchronized with the modulation and the bit rate (both of which are synchronous) of the received modulation signal SIGN. The output of this phase lock loop 310 is used to drive a detector 311 of the radiofrequency receiver 31, designed to perform the synchronous detection of the transmitted bits by means of the generated synchronization signal SCLK, in such a way that said detection is synchronized as a function of said received signal.

The receiver 31 of the transmission/reception device 30 of the gateway system 40 may be of a conventional type, but may advantageously be made in the form of a software defined radio (SDR). In this case, the receiver may comprise a part for the analog processing of the received signal, comprising filtering, preamplification and frequency transposition means, of the zero-IF or low-IF type for example, associated with an analog-digital converter (I/Q or low-IF), and a digital processing part, in the form of a DSP (digital signal processor), which demodulates the signal according to the principles described above, and which, in particular, supports the functions of digital filtering, phase locking, digital demodulation and error correction if required.

A phase-coherent FSK receiver of this type can provide a performance of about Eb/NO=9 dB for a binary error rate of 10-4. This solution can therefore be used to improve the link performance by 3 dB, while maintaining very high compatibility with the EN13757-4 standard.

In the particular case of a modulation index equal to 2 (with a modulation of +/−2.4 kHz and a bit rate of 2400 bps, for example), the receiver according to the invention may exploit the presence of a pair of discrete lines of high amplitude (50% of the total power) located at +/−2.4 kHz of the carrier, to quickly obtain a reliable estimate of the central frequency and the bit rate. A synchronous detector may advantageously be constructed on this basis, using the deterministic part of the signal.

In the particular case of a modulation index equal to 0.5 (with a modulation of +/−1.2 kHz and a bit rate of 4800 bps, for example), the receiver may exploit the fact that the modulation is almost equivalent to offset QPSK modulation, except as regards a differential coding. The receiver may therefore use a linear approximation and the a priori knowledge of the headers and preambles to synchronize itself and then perform synchronous detection.

According to a particular embodiment, in the case of bidirectional links between the metering devices 20 and the transmission/reception devices 30 of the gateway system or systems 40, the same architecture as that described above for supporting the radiofrequency link in the uplink direction can be used for downlink communications from the gateway system toward the metering devices. In this case, the radiofrequency transmission/reception device 30 also comprises a radiofrequency transmitter 32 comprising FSK modulation means 321, according to the specifications of the EN13757-4 standard, arranged, according to the invention, to modulate the carrier according to a modulation index strictly equal to an integer value divided by two, so that the generated modulation is phase-coherent. For its part, the radiofrequency module 22 of each metering device 20 also comprises a radiofrequency receiver 24 configured to exploit the specific features of this modulation. Thus, as explained above, this radiofrequency receiver 24 is composed, in particular, of a phase lock loop 240 which synchronizes itself with the modulation and the bit rate (which are both synchronous) of the received signal and of a synchronous detector 241 for detecting the transmitted bits.

However, it may also be decided to use the optimized modulation according to the invention solely to support communications in the uplink direction, that is to say from the metering devices toward the gateway systems, where the challenge in terms of retrieval of the transmitted frames is greater. Thus this intermediate solution can reduce costs while avoiding the need to upgrade the receivers of the radiofrequency modules of the metering devices to make them synchronous. To provide effective support for the radiofrequency link in this direction, it is possible and preferable to associate the conventional receiver at a metering device with a more powerful transmitter in the transmission/reception device of the gateway system and/or with a slower modulation, in order to balance the link budget.

The invention claimed is:

1. A radiofrequency transmission and reception device for a gateway system of a remote-reading apparatus, comprising:
   a plurality of metering devices, wherein;
      each metering device comprises a metering circuit and a radiofrequency circuit; and
         the radiofrequency transmission and reception device is configured to communicate with the radiofrequency circuit of one or more of the plurality of metering devices and with a hub device of the gateway system in communication with at least one external telecommunications network; and
   a radiofrequency receiver configured to:
      receive a phase-coherent frequency shift modulation signal (SIGN) from at least one metering device;
      generate a synchronization signal ($S_{CLK}$) synchronized with the modulation signal; and
      provide synchronous detection of the modulation signal by using the generated synchronization signal such that the synchronous detection is synchronized as a function of the modulation signal.

2. The radiofrequency transmission and reception device as claimed in claim 1, further comprising a radiofrequency transmitter configured to perform frequency shift modulation of a carrier, wherein the radiofrequency transmitter is configured to modulate the carrier according to a modulation index strictly equal to an integer value divided by two, so that a generated modulation is phase-coherent.

3. A metering device for a remote-reading apparatus, the metering device having a metering circuit and a radiofrequency circuit for communicating with at least one radiofrequency transmission and reception device of a gateway system of the remote-reading apparatus, the radiofrequency circuit comprising:
   a radiofrequency transmitter configured to perform frequency shift modulation of a carrier, wherein:
      the radiofrequency transmitter is configured to modulate the carrier according to a modulation index strictly equal to an integer value divided by two, so that a generated modulation is phase-coherent; and
      the radiofrequency circuit comprises a radiofrequency receiver configured to:
         receive a phase-coherent frequency shift modulation signal from the radiofrequency transmission and reception device;
         generate a synchronization signal synchronized with the modulation signal; and
         provide synchronous detection of the modulation signal using the generated synchronization signal, such that the synchronous detection is synchronized as a function of the modulation signal.

4. A remote-reading apparatus configured for use with water meters or gas meters and comprising:
   a plurality of metering devices as claimed in claim 3, wherein the gateway system comprises at least one radiofrequency transmission and reception device as claimed in claim 1.

5. A remote-reading apparatus configured for use with water meters or gas meters and comprising:
   a plurality of metering devices as claimed in claim 3, wherein the gateway system comprising at least one radiofrequency transmission and reception device as claimed in claim 2.

* * * * *